United States Patent [19]

Smith

[11] Patent Number: 4,561,460
[45] Date of Patent: Dec. 31, 1985

[54] DUAL ORIFICE CONTROL

[75] Inventor: Lyle B. Smith, Westland, Mich.

[73] Assignee: General Motors Corporation, Detroit, Mich.

[21] Appl. No.: 696,754

[22] Filed: Jan. 31, 1985

[51] Int. Cl.⁴ ............................................. F16K 17/18
[52] U.S. Cl. ................................. 137/493.2; 137/513.3
[58] Field of Search ............................................. 91/443; 137/493.1–493.6, 512.2, 513.3, 513.7

[56] References Cited

U.S. PATENT DOCUMENTS 2,634,947  4/1953  Gardner ............................ 137/513.3
3,152,606  10/1964  Vedder ............................. 137/493.2

Primary Examiner—Robert G. Nilson
Attorney, Agent, or Firm—Donald F. Scherer

[57] ABSTRACT

A control valve for a selectively engageable friction device has two flow rates for controlling piston movement during the application of the friction device. The valve includes a spring-loaded valve capsule slidably disposed in a stepped diameter bore between a feed passage and a control passage. When the fluid pressure in the feed passage exceeds the fluid pressure in the control passage by a predetermined amount, the capsule is moved in the bore against the spring so that, the outer cylindrical surface of the capsule and the largest portion of the bore cooperate to form an orifice which permits a high flow rate resulting in a rapid fill operation of the piston cylinder of the friction device. The pressure in the piston cylinder, sensed in the control passage, and the spring move the capsule into the next largest diameter portion of the bore to provide a reduced flow during the final pressurization of the piston cylinder of the friction device. A check valve in the capsule permits rapid exhausting of the friction device when the feed passage is exhausted.

1 Claim, 4 Drawing Figures

DUAL ORIFICE CONTROL

BACKGROUND OF THE INVENTION

This invention relates to control valves and more particularly to control valves providing dual slope pressure functions during the engagement of a friction device.

Prior art dual slope pressure devices utilize either a single orifice and an accumulator or a variable pressure regulator valve and an accumulator. While these devices provide satisfactory controls, they do require a significant amount of space. Since space is a valuable commodity in transmission controls, it is desirable to reduce the space requirements where possible.

SUMMARY OF THE INVENTION

It is an object of this invention to provide an improved control valve for a selectively engageable friction device wherein the control valve has two orifices, one of which provides rapid flow for fast filling and the other provides controlled pressure rise for smooth final engagement.

It is another object of this invention to provide an improved control valve for a selectively engageable friction device wherein the control valve includes a capsule slidably disposed in a stepped diameter bore and cooperating therewith to form two distinct orifices which establish distinct flow rates to the friction device during engagement thereof.

It is a further object of this invention to provide an improved flow control valve for a fluid-operated friction device, including a cylindrical capsule slidably disposed in a stepped diameter bore communicating fluid between a feed passage and a control passage, wherein the capsule is spring-loaded into an intermediate diameter bore toward the smaller diameter, and responds to a predetermined pressure in the feed passage to move into the larger diameter bore and cooperates therewith to establish a high flow orifice, for fast fill, and returns to the intermediate diameter bore at a predetermined pressure in the control passage to establish a low flow orifice whereby the pressure in the control passage rises at a slower rate during final engagement of the friction device.

It is a still further object of this invention to provide an improved control valve for establishing a dual slope pressure function in a selectively engageable friction device, wherein a spring-loaded capsule is disposed in a stepped diameter bore between a feed passage and a control passage, such that the capsule moves to a first position on increased pressurization of the feed passage to permit high fluid flow and a rapid pressure increase rate in the control passage and then moves to the original position on a predetermined pressure differential between the feed and control passages to restrict fluid flow and reduce the rate of pressure rise in the control passage.

DETAILED DESCRIPTION OF THE PREFERRED EMBODIMENT

Figure 1:
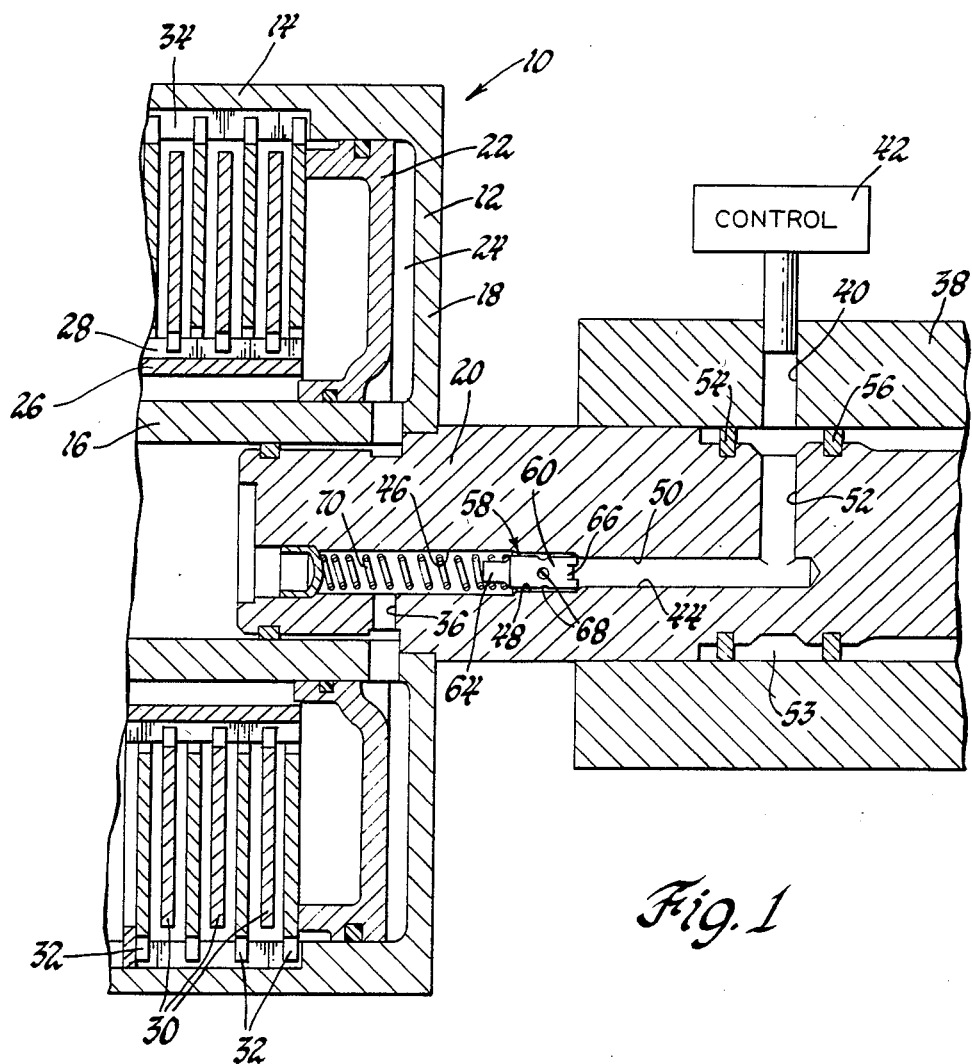
FIG. 1 is a sectional view of a friction device and shaft assembly incorporating the present invention showing the control valve in one operating position.

Referring to the drawings, wherein like characters represent the same or corresponding parts throughout the several views, there is seen in FIG. 1, a friction device, generally designated 10. The friction device 10 includes a housing 12 having an outer cylindrical portion 14, an inner cylindrical portion 16, and a connecting hub portion 18. The inner cylindrical portion 16 is drivingly connected to a shaft 20.

A fluid-operated piston 22 is slidably disposed in the inner and outer cylindrical portions 14 and 16, and cooperates with the hub 18 to form an apply chamber 24. The piston 22 is preferably spring-loaded toward the hub 18 by springs, not shown. A cylindrical hub member 26 is rotatably disposed or otherwise supported relative to the cylindrical portion 16. The hub 26 has a spline portion 28 to which is splined a plurality of friction discs 30. The friction discs 30 are interleaved with a plurality of friction discs 32 which are drivingly connected to a spline 34 formed on the cylindrical portion 14 of housing 12.

The apply chamber 24 is in fluid communication with a control passage 36 which, as will later be described, communicates pressurized fluid to the apply chamber 24. As is well-known in friction devices such as 10, when the apply chamber 24 is pressurized, the piston 22 will be moved to cause frictional engagement between the discs 30 and 32, such that a torque transmitting relationship is established between the housing 12 and the hub 26. This torque transmitting relationship may be effective to provide simultaneous rotation of the shaft 20 and hub 26 or braking of the shaft 20, if the hub 26 is connected to a stationary member such as the transmission housing, not shown.

The shaft 20 is rotatably supported in a portion of the transmission housing designated 38. The housing 38 has formed therein a feed passage 40 which is in communication with a conventional transmission control valve and pump assembly 42. The shaft 20 has formed therein an axially extending stepped diameter bore 44 which has a large diameter portion 46, an intermediate diameter portion 48 and a small diameter portion 50. The large diameter portion 46 is in fluid communication with the control passage 36, while the small diameter portion 50 is in fluid communication with a radial feed passage 52 which communicates with the outer surface of shaft 20.

Figure 3:
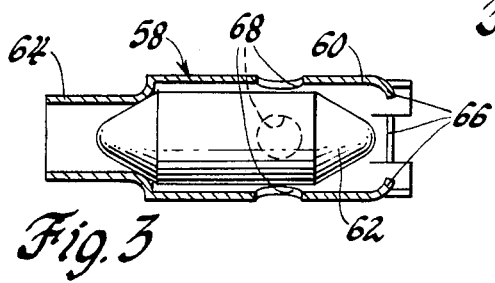
FIG. 3 is a cross-sectional view of a control valve used with the invention in the engagement mode of operation.
Figure 4:
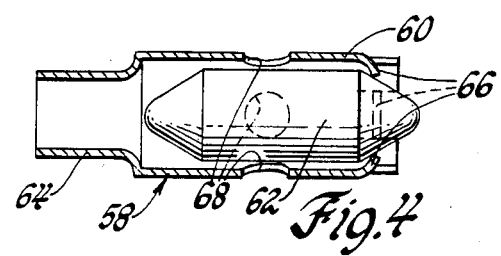
FIG. 4 is a view similar to FIG. 3 showing the control valve in the exhaust mode of operation.

The radial feed passage 52 communicates with a space 53 formed between a pair of spaced annular seals 54 and 56, which space 53 also communicates with the feed passage 40 formed in housing 38. The stepped diameter bore 44 houses a control valve, generally designated 58. As best seen in FIGS. 3 and 4, the control valve 58 includes a cylindrical capsule portion 60 and a pellet check valve 62. The capsule 60 has a reduced diameter portion 64 which is smaller than the outer diameter of check valve 62 and can be effectively sealed thereby as seen in FIG. 3.

Figure 2:
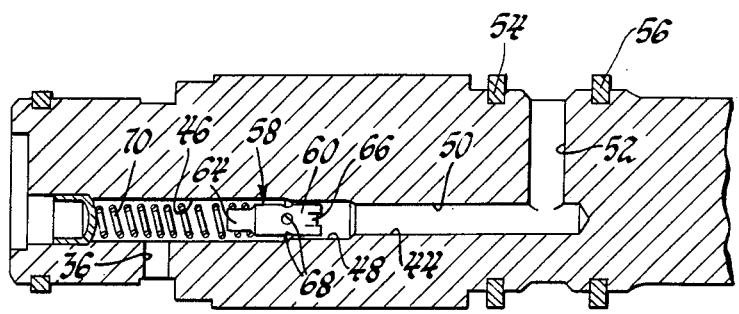
FIG. 2 is a sectional view showing a portion of FIG. 1 with the control valve in another operating position.

The capsule 60 also has a plurality of inwardly bent tang portions 66, which as seen in FIG. 4, provide a rightward stop for the check valve 62 while permitting fluid flow passed the outer surface thereof. The capsule 60 has a plurality of radial passages or holes 68 which communicate the inner area of capsule 60 with the stepped diameter bore intermediate diameter portion 48, as shown in FIG. 1, or the large diameter portion 46, as shown in FIG. 2. The valve 58 also includes a spring member 70 which is disposed in the large diameter 46 and urges the capsule 60 rightward such that the right end thereof seats at the intersection of small diameter 50 and intermediate diameter 48.

When the transmission control 42 is manipulated to cause engagement of the friction device 10, the feed passages 40 and 52 and small diameter 50 will be pressurized. The fluid pressure cannot be immediately transmitted through the capsule 60 to the control passage 36 and apply chamber 24. Therefore, small diameter 50 will be at a pressure significantly greater than large diameter 46 resulting in leftward movement of the capsule 60 until the radial passages 68 communicate fluid from the small diameter 50 to the large diameter 46. The outer cylindrical surface of capsule 60 cooperates with the surface of large diameter 46 to form a flow control orifice which establishes the rate of fluid flow to the control passage 36 and apply chamber 24.

As the fluid flows into apply chamber 24, the pressure in apply chamber 24, control passage 36 and large diameter 46 will increase. The pressure increase will cause the piston 22 to move into engagement with the friction disc 32 immediately adjacent the piston 22 thereby initiating engagement of the friction device 10. When this pressure level is reached, the spring force in spring 70 and the pressure in large diameter 46 will be sufficient to overcome the pressure in the intermediate diameter 48 such that the capsule 60 will return to the position shown in FIG. 1. In this position, further fluid flow to the apply chamber 24 must pass between the outer surface of capsule 60 and the inner surface of intermediate diameter 48. Since this clearance is less than the clearance with diameter 46, a reduced flow and less rapid pressure rise will be experienced in apply chamber 24. Thus, the final engagement portion of the friction device 10 takes place at a slower rate than the initial chamber fill portion. When the control 42 signals for the disengagement of friction device 10, feed passage 40 will be connected to exhaust. At this time, the pressure in large diameter 46 will cause the check valve 62 to move to the position shown in FIG. 4, such that rapid exhausting of the apply chamber 24 will occur.

From the foregoing, it is seen that the present invention provides a rapid rising pressure function which gives way to a less rapid rising pressure function during the engagement of the friction device by establishing two distinct orifice relationships between the pressure feed passage and the friction device control passage. It will also be appreciated that while these orifices provide controlled engagement they do not interfere with or limit the pressure exhaust function.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A dual orifice pressure control valve for controlling the flow of pressurized and exhaust fluid to and from a fluid operated friction device comprising; a feed passage; a friction device control passage; and valve means for controlling the communication of fluid under pressure between said passages including, a stepped diameter bore having three different diameter portions, a valve capsule disposed in one diameter portion and having a clearance therewith to establish a first orifice, check valve means disposed in said valve capsule for preventing direct fluid flow from said feed passage to said control passage, spring means urging said valve capsule into said one bore to seat against the step between the first and second of said three diameters, radial passage means in said capsule for bypassing said check valve means when fluid flow is from said feed passage to said control passage, said capsule being movable against said spring into the third of said three diameters when the fluid pressure in said feed passage is greater than the fluid pressure in said control passage by at least a predetermined amount, said third diameter, said capsule and said radial passage means cooperating to establish a second orifice for controlling fluid flow from said feed passage to said control passage, said second orifice providing a higher flow rate than said first orifice to provide a fast fill of the control passage, said first orifice establishing a lower flow rate to permit the fluid in said control passage to become equal to the fluid pressure in said feed passage at a rate slower than said fast fill.

* * * * *